United States Patent
Gruenberger et al.

(10) Patent No.: US 11,916,268 B2
(45) Date of Patent: Feb. 27, 2024

(54) CONVEYING UNIT FOR A FUEL CELL SYSTEM FOR CONVEYING AND/OR CONTROLLING A GASEOUS MEDIUM

(71) Applicant: Robert Bosch GmbH, Stuttgart (DE)

(72) Inventors: Andreas Gruenberger, Spraitbach (DE); Armin Richter, Leinfelden-Echterdingen (DE); Hans-Christoph Magel, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 566 days.

(21) Appl. No.: 17/279,892

(22) PCT Filed: Aug. 6, 2019

(86) PCT No.: PCT/EP2019/071085
§ 371 (c)(1),
(2) Date: Mar. 25, 2021

(87) PCT Pub. No.: WO2020/064189
PCT Pub. Date: Apr. 2, 2020

(65) Prior Publication Data
US 2022/0037686 A1     Feb. 3, 2022

(30) Foreign Application Priority Data
Sep. 25, 2018   (DE) ............... 10 2018 216 299.9

(51) Int. Cl.
*H01M 8/00*       (2016.01)
*H01M 8/04089*    (2016.01)
(Continued)

(52) U.S. Cl.
CPC ......... *H01M 8/04097* (2013.01); *F04F 5/16* (2013.01); *H01M 8/04201* (2013.01)

(58) Field of Classification Search
CPC .. H01M 8/04201; H01M 8/04097; F04F 5/54; F04F 5/16; F04F 5/44; F04F 5/461; Y02E 60/50
See application file for complete search history.

(56) References Cited

U.S. PATENT DOCUMENTS

| 9,029,032 B2 | 5/2015 | Noh et al. |
| 2014/0329156 A1 | 11/2014 | Mathie et al. |
| 2015/0214566 A1 | 7/2015 | Jung et al. |

FOREIGN PATENT DOCUMENTS

| CN | 1561556 A | 1/2005 |
| CN | 102820477 A | 12/2012 |

(Continued)

OTHER PUBLICATIONS

Formanski et al., Jet Pump Of Fuel Cell System Used In Vehicle, Has Suction Gas Inlet That Is Set For Recirculating Anode Gas, And Movable Valve Portion Which Is Projected Into Motive Nozzle For Selectively Opening And Completely Closing Motive Nozzle , Mar. 2018, See the Abstract. (Year: 2018).*

(Continued)

*Primary Examiner* — Cynthia H Kelly
*Assistant Examiner* — Monique M Wills
(74) *Attorney, Agent, or Firm* — Michael Best & Friedrich LLP

(57) ABSTRACT

A conveying unit (1) for a fuel cell system (31) for conveying and/or recirculating a gaseous medium, in particular hydrogen, comprising a jet pump (4) driven by a driving jet of a pressurized gaseous medium, and comprising a metering valve (6) with a nozzle (12), wherein: the conveying unit (1) is designed as a combined valve jet pump assembly (2); the gaseous medium is fed to the jet pump (4) by means of the metering valve (6); the jet pump (4) has a main body (8); and the jet pump (4) is connected to an anode inlet (3) of a fuel cell (29). According to the invention, a deflection and/or (Continued)

change of direction of the gaseous medium which flows in a flow direction VII from the jet pump (4) to the anode input (3) of the fuel cell (29) occurs exclusively in the deflection region (22), said jet pump (4) having a separate closure cover (5) connected to the main body (8), and the deflection region (22) and/or the deflection- or guiding geometry of the deflection region for the gaseous medium (22) is formed exclusively in the component of the closing cover (5).

19 Claims, 2 Drawing Sheets

(51) Int. Cl.
*F04F 5/16* (2006.01)
*H01M 8/04082* (2016.01)

(56) References Cited

FOREIGN PATENT DOCUMENTS

| CN | 105190050 A | 12/2015 | | |
|----|-------------|---------|---|---|
| DE | 102010043618 A1 | 5/2012 | | |
| DE | 102011113022 A1 | 3/2013 | | |
| DE | 102012007384 A1 | * 10/2013 | ............... | F04F 5/16 |
| DE | 102014105995 A1 | 11/2014 | | |
| DE | 102016218923 A1 | * 3/2018 | | |
| DE | 102017212726 B3 | 9/2018 | | |
| DE | 102017220800 A1 | 5/2019 | | |
| DE | 102017222390 A1 | 6/2019 | | |
| DE | 102018200314 A1 | 7/2019 | | |
| JP | 2002056868 A | 2/2002 | | |
| JP | 2007303638 A | 11/2007 | | |
| JP | 2012017835 A | 1/2012 | | |
| WO | 2008043377 A1 | 4/2008 | | |

OTHER PUBLICATIONS

Hornburg et al, Anode Circuit For Fuel Cell Used For Providing Electrical Power To E.g. Rail Vehicle, Has Valve Device Arranged In Recirculation Conveyor To Stop Flow Of Fuel Through Recirculation Line Which Connects Output And Input Of Anode Chamber, Oct. 2013, See the Abstract. (Year: 2013).*

Translation of International Search Report for Application No. PCT/EP2019/071085 dated Oct. 15, 2019 (2 pages).

* cited by examiner

CONVEYING UNIT FOR A FUEL CELL SYSTEM FOR CONVEYING AND/OR CONTROLLING A GASEOUS MEDIUM

BACKGROUND

The present invention relates to a conveying unit for a fuel cell system for conveying and/or controlling a gaseous medium, in particular hydrogen, which is provided in particular for use in vehicles with a fuel cell drive.

In the vehicle sector, in addition to liquid fuels, in future gaseous fuels will also become increasingly important. In particular in vehicles with a fuel cell drive, hydrogen gas flows have to be controlled. The gas flows are in this instance no longer controlled in a discontinuous manner as in the injection of liquid fuel, but instead the gas is removed from at least one tank, in particular a high-pressure tank, and directed via a supply line of a medium-pressure pipe system to the conveying unit. This conveying unit guides the gas via a connection line of a low-pressure pipe system to a fuel cell.

DE 10 2014 105 995 A1 discloses a conveying unit for a fuel cell system for conveying a gaseous medium, in particular hydrogen, using a jet pump which is driven by means of a propulsion jet of a pressurized gaseous medium and a metering valve. In this instance, the conveying unit may be configured as a combined valve/jet pump arrangement and has the components first inlet, suction region, mixing pipe and a diffusor region, and wherein the metering valve has a second inlet and a nozzle. In this instance, using the conveying unit a medium, in particular a propellant, can be discharged through the nozzle and is then mixed with a recirculation medium. The flow of the propellant may in this instance be controlled by means of the metering valve.

The conveying unit known from DE 10 2014 105 995 A1 may have specific disadvantages.

When the conveying unit is fitted to an anode input of the fuel cell, the medium which is intended to be conveyed has to be redirected downstream of the conveying unit, in particular after flowing through the diffusor region, before it can flow into the anode input. During this redirection, in particular a flow redirection of the medium which is intended to be conveyed, as a result of the redirection which occurs in a flow line system which is constructed, for example, as a pipeline system, flow losses and/or pressure losses may occur between the conveying unit, in particular the combined valve/jet pump arrangement, and the anode input. In this instance, the level of efficiency of the overall fuel cell system, in particular the valve/jet pump arrangement, is reduced. Furthermore, the connection of the conveying unit and the anode input using pipelines is disadvantageous since in pipelines over the entire service-life of the fuel cell system, in particular in the event of significant temperature fluctuations, problems with leakages may occur, in particular in the case of welded and/or bonded pipelines. The probability of failure of the entire fuel cell system is thereby increased.

SUMMARY

According to the invention, a conveying unit for a fuel cell system is proposed for conveying and/or recirculating a gaseous medium, in particular hydrogen, wherein the hydrogen is referred to below as $H_2$.

There is brought about a redirection and/or direction change of the gaseous medium flowing in a flow direction VII from a jet pump to an anode input of a fuel cell exclusively in a redirection region and wherein the jet pump has a separate closure lid which is connected to a base member, wherein the redirection region and/or a redirection and guiding geometry of the redirection region for the gaseous medium is constructed exclusively in the component closure lid. In this manner, the redirection and guiding geometry can be integrated in the jet pump and no further redirection of the medium to be conveyed is required in a flow line system and/or pipeline system between the conveying unit, in particular a diffusor region, and the anode input of the fuel cell. Furthermore, the flow losses and/or pressure losses as a result of the redirection can be kept as small as possible. To this end, the radius in the redirection region and/or the redirection and guiding geometry of the redirection region for the gaseous medium is configured in such a manner that the lowest possible level of friction occurs between the medium which is intended to be conveyed, in particular $H_2$, and the surface of the flow geometry of the redirection region. Consequently, as a result of the flow redirections and/or change of the flow directions of the gaseous medium as a result of the curvature, pressure losses and friction losses can be reduced, whereby the degree of efficiency of the conveying unit and/or a valve/jet pump arrangement and/or the entire fuel cell system are improved. In addition, as a result of the integration of the redirection region in the jet pump, in particular in the closure lid, the advantage can be afforded that between the output of the valve/jet pump arrangement and the anode input of the fuel cell, there is the smallest possible spacing and consequently a shorter flow line is formed. The flow losses and/or pressure losses can thereby be kept small, whereby the degree of efficiency of the fuel cell system can be further improved. Furthermore, as a result of the configuration of the conveying unit according to the invention, the advantage can be afforded that the risk of leakages of the fuel cell system is reduced since a pipeline system, in particular between the jet pump and the fuel cell, is either no longer required or is required only in shortened form. In addition, an integration of the redirection region in the jet pump is advantageous in so far as no additional structural space, for example in the form of additional pipework, is required. Consequently, the advantage of a compact construction type of the conveying unit can be achieved.

According to an advantageous embodiment of the conveying unit, the closure lid has a redirection nozzle with a preferably cylindrical outer shape, wherein the redirection nozzle of the closure lid in the installed state extends in the base member in the direction of a longitudinal axis and wherein the redirection nozzle preferably has a recess in the inner shape thereof, wherein the recess serves in particular to guide the flow of the gaseous medium. Furthermore, the conveying unit is configured in such a manner that in the redirection region using the redirection nozzle a redirection and/or direction change of the gaseous medium is carried out almost at right-angles. In this manner, a redirection of the gaseous medium can be achieved in such a manner that the smallest possible friction losses occur, whereby the degree of efficiency of the jet pump and/or the conveying unit and/or the entire fuel cell system can be improved. In addition, no additional pipelines are required between the jet pump and the anode input, whereby the number of additional components for implementing a redirection, in particular a flow redirection of the gaseous medium, is reduced. Furthermore, the complexity of the fuel cell system can be reduced since fewer components are required. The material costs, the production costs and the assembly costs can thereby be reduced. Furthermore, the mass of the construction material of the fuel cell system can be reduced and/or the thermal capacity can be reduced, whereby more rapid heating of the conveying unit is achieved and ice bridges which are consequently formed can be more rapidly broken down. Consequently, damage to the components of the conveying unit and other components of the fuel cell system, in particular a diaphragm of a stack, as a result of ice bridges and/or ice particles which are also carried in the medium to be conveyed and which can be released from the surfaces in the event of an excessively slow heating of the conveying unit during a cold-start operation is prevented.

According to an advantageous development of the conveying unit, a connection piece is located between the closure lid and the anode input of the fuel cell. In this manner, the advantage can be afforded that the flow connection between the jet pump, in particular the closure lid, and the anode input can be produced to be as short as possible, at least virtually without any flow losses. Consequently, as a result of the reduced friction losses, the degree of efficiency of the conveying unit and consequently of the entire fuel cell system can be increased. Furthermore, as a result of the integration of the connection piece as a portion of the base member of the jet pump, the transitions in the flow region of the conveying unit between the part-pieces of the jet pump can be configured to be optimized in terms of flow. The flow resistance of the conveying unit particularly in the region of the part-pieces diffusor region, redirection region and connection piece can thereby be reduced. As a result of the configuration according to the invention, the flow speed of the medium which is intended to be conveyed in the inner flow cross-section can be kept to a high level and almost no friction and/or flow losses are produced. The degree of efficiency of the conveying unit and consequently the degree of efficiency of the entire fuel cell system can thereby be increased. In addition, as a result of the configuration of the conveying unit according to the invention, the advantage can be afforded that the conveying unit and/or the combined valve/jet pump arrangement can be connected in a space-saving and compact construction type to an end plate of a fuel cell, whereby the spatial requirement and the structural space of the fuel cell system in the whole vehicle can be reduced.

According to a particularly advantageous embodiment, the recess of the redirection nozzle connects the diffusor region and the connection piece of the jet pump at least indirectly to each other in fluid terms. Furthermore, the recess of the redirection nozzle is formed in such a manner that it is open with respect to the flow cross-section of the diffusor region and the flow cross-section of the connection piece so that the gaseous medium can flow through the redirection nozzle in the flow direction VII. In addition, the redirection nozzle has in the region of the recess in the inner flow cross-section thereof at least partially an at least approximately spherical inner face. In this manner, the advantage can be afforded that the transitions in the flow cross-section of the conveying unit between the part-pieces diffusor region, redirection region and connection piece are configured in the most flowing and flow-optimized manner possible. In this instance, particularly gaps or edges which can cause turbulence or flow disruptions of the medium which is intended to be conveyed are almost prevented in the region of these transitions. As a result of such gaps or edges in the flow cross-section, turbulence or braking of the flow of the medium which is intended to be conveyed may occur. Consequently, as a result of the configuration of the conveying unit according to the invention, the internal flow resistance in the flow cross-section can be reduced, whereby the degree of efficiency of the conveying unit is increased.

Furthermore, as a result of such a configuration of the redirection nozzle according to the invention and/or the recess of the redirection nozzle, a cost-effective production of the redirection region in the conveying unit can be achieved since the redirection flow geometry only has to be introduced into the redirection nozzle component. In addition, the closure lid with the redirection nozzle prior to a potential assembly in the base member of the jet pump is readily accessible for a production method which is in particular a machining production method and only a relatively small component has to be processed and clamped on a processing machine. Consequently, the production costs, the processing costs and the component costs can be reduced. In addition, an increased diffusion sealing can be achieved in this manner since the components which form the flow cross-section between a mixing pipe of the jet pump and the anode input of the fuel cell have the fewest possible interfaces, wherein the interfaces between the components in the event of a defective connection method are susceptible to leakages. Consequently, the probability of failure of the conveying unit as a result of a leakage of the flow cross-section of the fuel cell system can be reduced.

According to an advantageous embodiment, the closure lid of the conveying unit is connected to the base member by means of a releasable connection, in particular a screw connection. In this instance, the closure lid can be disassembled from the base member, particularly when the screw connection is released. In this manner, the advantage can be afforded that, in the event of damage to the flow cross-section in the redirection region of the conveying unit, for example, as a result of ice particles at a low ambient temperature and/or a cold-start procedure, a cost-effective and rapid repair of the damage can be achieved by changing the closure lid by releasing the screw connection. The closure lid can also be separated from the base member rapidly and without a destructive processing operation in the event of maintenance work and/or repairs, whereby the ease of maintenance is increased and the maintenance costs and/or operating costs can be reduced. In addition, it is possible to prevent the entire conveying unit from having to be replaced in the event of damage to the redirection region and/or the adjacent flow regions, it being instead sufficient to replace the closure lid.

According to a particularly advantageous configuration of the conveying unit, the part-pieces base member and/or closure lid is/are produced from a material or an alloy with a low specific thermal capacity. Furthermore, the components base member and/or closure lid of the jet pump may be produced from a metal material or a metal alloy. In addition, the combined valve/jet pump arrangement may have a heating element. Since during operation of the fuel cell system water in the region of the fuel cell can diffuse from a cathode region into an anode region through a diaphragm, this water can also flow in the flow region of the anode side and accumulate at specific locations. When a vehicle is switched off and consequently a fuel cell system is switched off, this water at low temperatures, in particular below 0° C., and in the event of long standing times of the vehicle, may freeze and form so-called ice bridges. These ice bridges can damage the components of the fuel cell system and/or the conveying unit and/or the jet pump. Consequently, as a result of the improved thermal conductivity of the material used, a more rapid heating of the part-pieces base member and/or closure lid and consequently of the entire conveying unit can be carried out. Another measure to produce a rapid heating of the conveying unit according to the invention is the use of a heating element. In this manner, in the context of a cold-start procedure, before the conveying unit and/or the entire fuel cell system is operated at low temperatures, the heating element can be supplied with energy, in particular electrical energy, wherein the heating element converts this energy into heat and/or heat energy. This process is advantageously supported by the low specific thermal capacity of the additional components of the conveying unit, by means of which the heat energy can rapidly penetrate into the entire conveying unit and can eliminate any ice bridges which are present. As a result of the more rapid heating of the part-pieces and the conveying unit, ice bridges which are present can be eliminated more rapidly, in particular by melting as a result of the application of heat. In addition, in the event of a cold-start procedure the heat energy can penetrate in a short period of time after the heating element has been switched on to a nozzle and ice bridges which are present in the region of the nozzle and the actuator system of the metering valve can be heated and consequently eliminated. The probability of failure as a result of damage to the components of the conveying unit can thereby be reduced. In this manner, the cold-start capability of the conveying unit and consequently of the entire fuel cell system can be improved since the ice bridges can be more rapidly melted and eliminated. In addition, less energy, in particular electrical energy and/or heat energy as a result of the heating element used, has to be introduced into the conveying unit. As a result, the operating costs of the conveying unit and the entire fuel cell system can be reduced, in particular in the case of frequent cold-start operations as a result of low ambient temperatures and/or long standing times of the vehicle. Furthermore, as a result of the use of the material according to the invention, a high level of resistance with respect to the medium which is intended to be conveyed by the conveying unit and/or additional components from the environment of the conveying unit, such as, for example, chemicals, can be achieved. This in turn increases the service-life of the conveying unit and the probability of failure as a result of material damage to the housing can be reduced.

According to an advantageous development of the conveying unit, the cross-sectional surface-areas of the end portion of the diffusor region, the jet pump, the redirection region, the connection piece of the jet pump and the anode input which extend orthogonally with respect to the flow direction VII are at least substantially identical. In this manner, a volume flow and consequently a flow speed of the medium in the conveying unit can be kept constant, whereby the energy losses can be reduced by the acceleration or the braking of the medium. Furthermore, the friction losses of the medium with the walls of the flow region of the conveying unit which occur with a changing flow cross-section are reduced. Consequently, as a result of the configuration of the conveying unit according to the invention, the internal flow resistance in the flow cross-section can be reduced, whereby the degree of efficiency of the conveying unit is increased. Furthermore, as a result of such a formation of the cross-sectional surface areas of the part-pieces of the conveying unit, the advantage can be afforded that, during the redirection of the gaseous medium in the redirection region, the friction losses and/or the pressure losses and/or the flow losses are kept small. This is possible since, in addition to the redirection of the medium, additional structural configurations which bring about the above-mentioned losses are not present on the conveying unit, such as, for example, changing cross-sectional surface-areas prior to the redirection region, in the redirection region and/or behind the redirection region. Such embodiments may lead to a flow backlog of the medium, wherein such a flow backlog leads to additional friction losses and/or pressure losses and/or flow losses, whereby the degree of efficiency of the overall conveying unit is further impaired.

According to a particularly advantageous embodiment, the metering valve is configured as a proportional valve. In this manner, the advantage can be afforded that the weight of the conveying unit is reduced and a compact construction type can be achieved since a metering valve which is configured as a proportional valve requires less structural space and has a lower inherent weight. In addition, using the proportional valve a more precise and rapid control of the metering valve can be carried out, compared with alternative technical embodiments of the metering valve. Consequently, the advantage can be afforded that the quantity and the time of a propellant which is supplied by means of the metering valve into a suction region and/or the mixing pipe of the jet pump can be metered more precisely, whereby the degree of efficiency of the jet pump and consequently of the overall conveying unit can be improved.

According to an advantageous development, the nozzle and the mixing pipe of the conveying unit are configured in a rotationally symmetrical manner, wherein the nozzle extends coaxially with respect to the mixing pipe of the jet pump. In this manner, the advantage can be afforded that an improved mixing of the propellant with the recirculated substance in the jet pump, in particular in the suction region and/or in the mixing pipe, can be achieved. Furthermore, an improved pulse transmission from the propellant from the metering valve to the recirculated substance in the suction region and in the region of the mixing pipe can be carried out. Consequently, the degree of efficiency of the conveying unit can be increased and the operating costs of the conveying unit can be reduced with the same conveying capacity.

BRIEF DESCRIPTION OF THE DRAWINGS

With reference to the drawings, the invention is described in greater detail below.

In the drawings.

DETAILED DESCRIPTION

Figure 1:
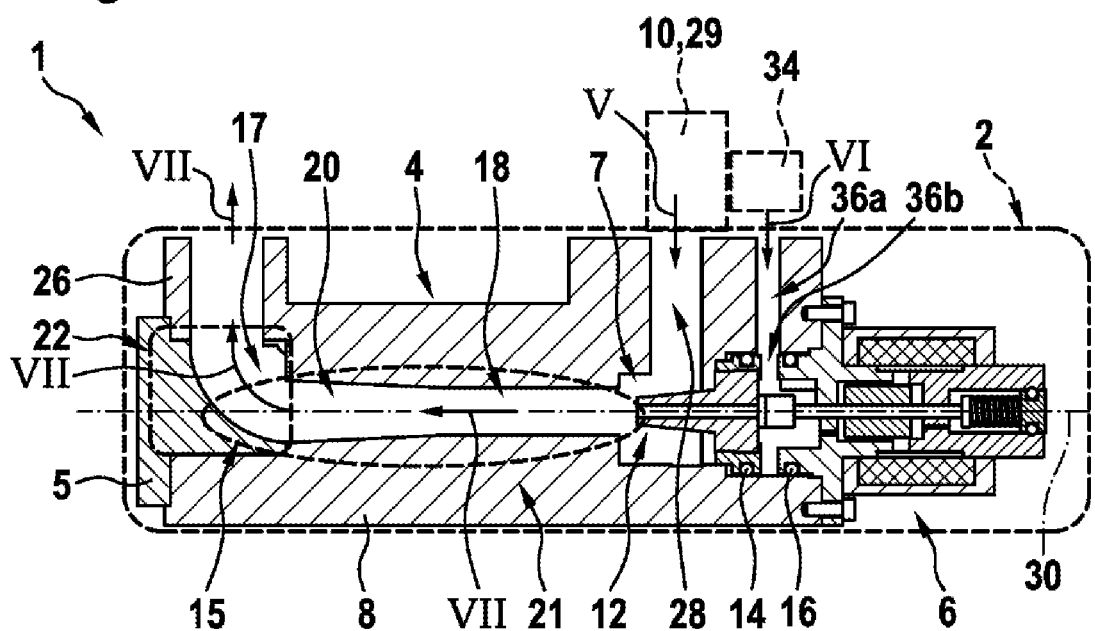
FIG. 1 is a schematic sectioned view of a conveying unit with a combined valve/jet pump arrangement.

The illustration according to FIG. 1 is a schematic sectioned view of a conveying unit 1, wherein the conveying unit 1 has a combined valve/jet pump arrangement 2. The combined valve/jet pump arrangement 2 has in this instance a metering valve 6 and a jet pump 4, wherein the metering valve 6 is connected, for example, by means of a screw connection, to the jet pump 4, in particular to a base member 8 of the jet pump 4.

The jet pump 4 has the components base member 8 and closure lid 5. In this instance, the jet pump 4 has in the region of one or both components a first inlet 28, a second inlet 36a, a suction region 7, a mixing pipe 18, a diffusor region 20 and a redirection region 22 and/or a connection piece 26. The metering valve 6 has a second inlet 36b, a first sealing element 14, a second sealing element 16 and a nozzle 12. In this instance, the metering valve 6 is inserted in particular in the direction of a longitudinal axis 30 into the jet pump 6, in particular into an opening in the base member 8 of the jet pump 6. The closure lid 5 may in an exemplary embodiment of the conveying unit 1 be inserted into the base member 8 in the direction of the longitudinal axis 30.

In FIG. 1, it is additionally illustrated that a medium which is intended to be conveyed flows through the combined valve/jet pump arrangement 2 in a flow direction VII. The majority of the regions of the valve/jet pump arrangement 2 which are flowed through are in this instance constructed in an at least approximately tubular manner and serve to convey and/or guide the gaseous medium, which may in particular be $H_2$, in the conveying unit 1. In this instance, the gaseous medium flows through a central flow region 21 inside the base member 8 parallel with the longitudinal axis 30 in the flow direction VII, wherein the central flow region 21 begins in the region of the opening of the nozzle 12 in the suction region 7 and extends through the mixing pipe 18, the diffusor region 20 as far as the redirection region 22. In this instance, on the one hand, a recirculated substance is supplied to the valve/jet pump arrangement 2 via the first inlet 28, wherein the recirculated substance may in particular be the unconsumed $H_2$ from an anode region of a fuel cell 29, in particular a stack, wherein the recirculated substance may also have water and nitrogen. The recirculated substance flows in this instance on a first flow path V into the valve/jet pump arrangement 2. On the other hand, through the second inlet 36 on a second flow path VI from outside the valve/jet pump arrangement 2 a gaseous propellant, in particular $H_2$, flows into a recess of the valve/jet pump arrangement 2 and/or into the base member 8 and/or the metering valve 6, wherein the propellant may come from a tank 34 and is under high pressure. In this instance, the second inlet 36a, b extends through the components base member 8 and/or metering valve 6. From the metering valve 6, the propellant is discharged by means of an actuator system and a completely closable valve element, in particular in a pulsed manner, through the nozzle 12 into the suction region 7 and/or the mixing pipe 18. The $H_2$ which flows through the nozzle 12 and which acts as a propellant has a pressure difference with respect to the recirculation medium, which flows from the first inlet 28 into the conveying unit 1, wherein the propellant in particular has a higher pressure of at least 10 bar. So that a so-called jet pump effect is produced, the recirculation medium is conveyed at a low pressure and a low mass flow into the central flow region of the conveying unit 1, for example, by using a side channel compressor 10 which is arranged upstream of the conveying unit 1 (not shown in FIG. 1). In this instance, the propellant flows with the described pressure difference and at a high speed, which in particular may be close to the speed of sound, through the nozzle 12 into the central flow region 21 of the suction region 7 and/or the mixing pipe 18. The nozzle 12 has in this instance an inner recess in the form of a flow cross-section, through which the gaseous medium can flow, in particular coming from the metering valve 6 and flowing into the suction region 7 and/or the mixing pipe 18. In this instance, the propellant strikes the recirculation medium, which is already in the central flow region of the suction region 7 and/or the mixing pipe 18. As a result of the high speed and/or pressure difference between the propellant and the recirculation medium, an internal friction and turbulence between the media are produced. In this instance, there is produced a shearing strain in the boundary layer between the rapid propellant and the significantly slower recirculation medium. This tension brings about a pulsed transmission, wherein the recirculation medium is accelerated and carried along. The mixing takes place in accordance with the principle of momentum conservation. In this instance, the recirculation medium is accelerated in the flow direction VII and a pressure drop is produced for the recirculation medium, whereby a suction effect is started and consequently additional recirculation medium is further conveyed from the region of the first inlet 28. This effect may be referred to as the jet pump effect. By controlling the additional metering of the propellant using the metering valve 6, a conveying rate of the recirculation medium can be regulated and can be adapted to the respective requirement of an overall fuel cell system 31 depending on the operating state and operating requirements. In an exemplary operating state of the conveying unit 1 in which the metering valve 6 is in the closed state, it is possible to prevent the propellant from the second inlet 36 from subsequently flowing into the central flow region of the jet pump 4 so that the propellant can no longer flow in the flow direction VII to the recirculation medium into the suction region 7 and/or the mixing pipe 18 and consequently the jet pump effect is stopped.

After passing the mixing pipe 18, the mixed medium which is intended to be conveyed and which comprises in particular the recirculation medium and the propellant flows in the flow direction VII into the diffusor region 20, wherein a reduction of the flow speed may occur in the diffusor region 20. From there, the medium flows in the flow direction VII from the diffusor region 20 into the redirection region 22, in which it is subjected to a corresponding redirection, and from there onward via the connection piece 26 into an anode input 3 of the fuel cell 29.

In this instance, the closure lid 5 has a redirection nozzle 15 having a recess 17, wherein the redirection nozzle 15 protrudes into an opening of the base member 8 and by means of the recess 17 forms the flow region and/or flow cross-section of the jet pump 4 in the redirection region 22. In this instance, as a result of the recess 17 of the redirection nozzle 15, the diffusor region 20 and the connection piece 26 of the jet pump 4 are at least indirectly connected to each other in fluid terms. Furthermore, the recess 17 of the redirection nozzle 5 is formed in such a manner that it is open in the direction toward the flow cross-section of the diffusor region 20 and the flow cross-section of the connection piece 26 so that the gaseous medium can flow through the redirection nozzle 15 in the flow direction VII. In this manner, in the redirection region 22 by means of the redirection nozzle 15 a redirection and/or direction change of the gaseous medium can be carried out almost at right-angles. The closure lid 5 is in this instance connected by means of a releasable connection, in particular a screw connection, to the base member 8 so that the closure lid 5 can be disassembled from the base member 8. Furthermore, the closure lid 5 may be produced from a different material from that of the base member 8, wherein the two materials in particular have different thermal expansion coefficients. In addition, the closure lid 5 may in an exemplary embodiment be cooled prior to the assembly and insertion into the base member 8 and the fixing by means of a screw connection in such a manner that the diameter, in particular of the redirection nozzle 15, is reduced. In this manner, a simplified assembly can be achieved as a result of the reduced diameter of the closure lid 5, in particular the redirection nozzle 15. In a further advantageous manner, the diameter expands when the ambient temperature is reached in such a manner that improved sealing and/or encapsulation properties between the components closure lid 5 and base member 8 can be achieved. A third sealing element may further be located between the closure lid 5 and the base member 8.

The objective of the first sealing element 14 shown in FIG. 1 and/or the second sealing element 16 is the encapsulation of the propellant which flows via the second flow path VI into the metering valve 6 and which is under high pressure. The respective sealing element is in this instance constructed as a sealing element 14, 16 which extends around the metering valve 6, in particular as an O-ring. The at least one sealing element 14, 16 in this instance prevents the propellant from being able to be discharged from the region of the second inlet 36 and/or the medium which is intended to be conveyed from being able to be discharged from inside the base member 8 and/or the metering valve 6 and from being able to be introduced into the region outside the valve/jet pump arrangement 2 by the at least one sealing element 14, 16 producing an encapsulating effect between the metering valve 6 and the base member 8. In the region outside the valve/jet pump arrangement 2, the medium which is intended to be conveyed could bring about an unfavorable reaction with the surrounding oxygen and damage the conveying unit 1 and/or the entire vehicle.

Furthermore, the jet pump 4 from FIG. 1 has technical features which additionally improve the jet pump effect and the conveying efficiency and/or which further improve the cold-start operation and/or production and assembly costs. In this instance, the part-piece diffusor region 20 extends in the region of the inner flow cross-section thereof in a conical manner, in particular increasing in the flow direction VII. As a result of this formation of the part-piece diffusor region 20, the advantageous effect can be produced that the kinetic energy is converted into pressure energy, whereby the potential conveying volume of the conveying unit 1 can be further increased, whereby more of the medium which is intended to be conveyed, in particular $H_2$, can be supplied to the fuel cell 29, whereby the degree of efficiency of the overall fuel cell system 31 can be increased.

According to the invention, the metering valve 6 may be configured as a proportional valve 6 in order to enable an improved metering function and a more precise metering of the propellant into the suction region 7 and/or the mixing pipe 18. In order to further improve the flow geometry and the degree of efficiency of the conveying unit 1, the nozzle 12 and the mixing pipe 18 are configured in a rotationally symmetrical manner, wherein the nozzle 12 extends coaxially relative to the mixing pipe 18 of the jet pump 4.

Figure 2:
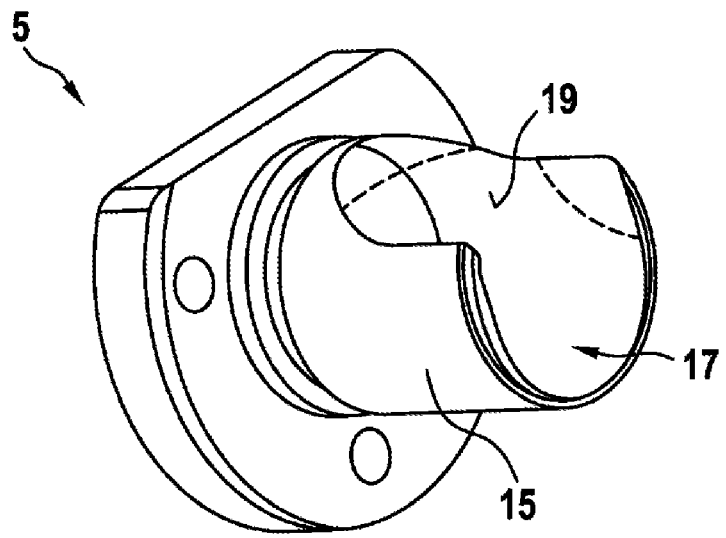
FIG. 2 is a perspective illustration of a closure lid of the conveying unit according to the invention.

FIG. 2 is a perspective illustration of the closure lid 5 according to the invention with the redirection nozzle 15. In this instance, the closure lid 5 has the redirection nozzle 15 with a preferably cylindrical outer shape, wherein the redirection nozzle 15 of the closure lid 5 in the assembled state extends in the base member 8 in the direction of a longitudinal axis 30 (as shown in FIG. 1) and wherein the redirection nozzle 15 preferably has a recess 17 in the inner shape thereof, wherein the recess 17 serves in particular to guide the flow of the gaseous medium. It is additionally shown in FIG. 2 that the redirection nozzle 15 in the region of the recess 17 in the inner flow cross-section thereof has at least partially an at least approximately spherical inner face 19. As a result of this at least approximately spherical inner face 19, in the event of the redirection of the medium to be conveyed in the redirection region 22 of the jet pump 4 there are fewer friction losses since in this manner the friction between the medium which is intended to be conveyed and the inner face 19 and/or the flow geometry of the closure lid 5 is reduced. In this manner, friction losses and/or pressure losses and/or the flow losses in this region are kept small, whereby the degree of efficiency of the conveying unit 1 is improved. The inner face 19 also has the lowest possible level of surface roughness, which leads to a further reduction of the flow losses.

As shown in FIG. 2, the redirection nozzle 15 in the region of the inner face 19 has such a terminating contour of the spherical inner face 19 to the additional flow cross-sections of the diffusor region 20 and the connection piece 26 that the transitions from the spherical contour of the inner face 19 to the additional flow cross-sections are configured to be optimized in terms of flow. The flow resistance of the conveying unit 1, in particular in the region of the part-pieces diffusor region 20, redirection region 22 and connection region 26, can thereby be reduced. As a result of the configuration according to the invention, the flow speed of the medium which is intended to be conveyed in the inner flow cross-section can be kept constant and there are almost no friction and/or flow losses. The degree of efficiency of the valve/jet pump arrangement 2, the conveying unit 1 and consequently the degree of efficiency of the overall fuel cell system 31 can thereby be increased. In this instance, the inner flow cross-section is smooth and configured to be optimized in terms of flow so that the lowest possible level of flow resistance is produced as a result of the surfaces which are joined in this region and which are located in the inner flow cross-section. A further improvement of the flow optimization of the surfaces can be achieved as a result of a mechanical subsequent processing operation of the surfaces of the part-pieces located in the inner flow cross-section by the pieces being, for example, deburred, ground, milled or polished which is possible only when a materially engaging connection method is used, in particular with metal part-pieces of the base member 8 and/or the closure lid 5.

Figure 3:
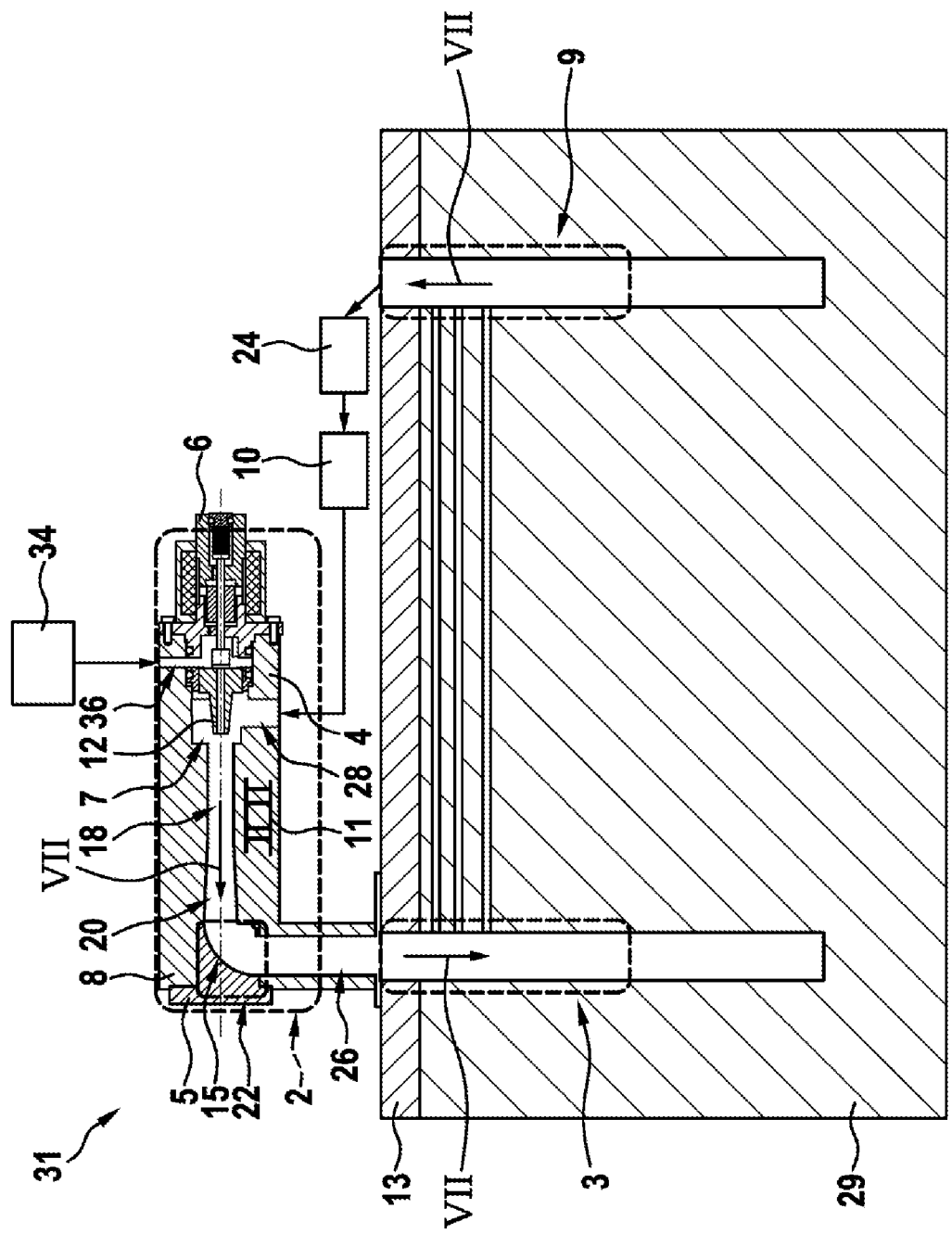
FIG. 3 is a partially schematic sectioned view of a fuel cell system with the valve/jet pump unit and a fuel cell.

The illustration according to FIG. 3 is a partially schematic sectioned view of a fuel cell system 31 with the valve/jet pump unit 2, a fuel cell 29 and the optional components water separator 24 and side channel compressor 10. In this instance, it is shown that the combined valve/jet pump arrangement 2 is mounted and/or fitted on the fuel cell 29, wherein the valve/jet pump arrangement 2 is mounted in particular on an end plate 13 of the fuel cell 29. FIG. 3 shows in this instance that the gaseous medium flowing through the jet pump 4 in the flow direction VII and parallel with the longitudinal axis 30 prior to entering the anode input 3 of the fuel cell 29 must be subjected to a redirection and consequently a flow direction change.

In this instance, FIG. 3 shows that a redirection and/or direction change of the gaseous medium flowing in a flow direction VII from the jet pump 4 to the anode input 3 of the fuel cell 29 is carried out exclusively in the redirection region 22, wherein the jet pump 4 has a separate closure lid 5 which is connected to the base member 8 and wherein the redirection region 22 and/or the redirection and guiding geometry of the redirection region 22 for the gaseous medium is formed exclusively in the component closure lid 5.

FIG. 3 shows that, on the one hand, the unconsumed gaseous medium from an anode output 9 of the fuel cell 29, in particular a stack, in the flow direction VII through the end plate 13, via an optional water separator 24 and an optional side channel compressor 10 flows into the first inlet 28 of the valve/jet pump arrangement 2. From there, the gaseous medium flows into the suction region 7 and partially into the mixing pipe 18 of the jet pump 4. The water separator 24 has in this instance the purpose of discharging water which is produced during operation of the fuel cell 29 and which flows together with the gaseous medium, in particular $H_2$, through the anode output 9 back into the valve/jet pump arrangement 2 from the system. Consequently, the water which may be present in gas and/or liquid form cannot penetrate into the recirculation fan 10 and/or the jet pump 4 and/or a metering valve 6 since it is already separated directly by the water separator 24 from the gaseous medium and is discharged from the fuel cell system 31 in the conveying direction. Damage to the components of the conveying unit 1 and/or the fuel cell system 31, in particular the movable parts of the components, as a result of corrosion can thereby be prevented, whereby the service-life of all the components which are subjected to flow is increased. Furthermore, an early and rapid separation of the water in the fuel cell system 31 may increase the degree of efficiency of the conveying unit 1. This is a result of the fact that the water does not also have to be carried by other components of the conveying unit 1 with the gaseous medium, in particular H$_2$, which would bring about a reduction of the degree of efficiency since, for the proportion of water in the conveying unit 1, less of the gaseous medium can be conveyed and the water has a higher mass. Consequently, by using and as a result of the respective arrangement of the water separator 24, the advantage can be afforded that the degree of efficiency of the conveying unit 1 can be increased. By redirecting the medium via the redirection nozzle 15 in the redirection region 22, the medium does not have to be subjected to any further subsequent redirection and, after passing the outlet manifold 22, can flow into the anode input 3 almost without any further redirection or with only little additional redirections and friction losses. In an exemplary embodiment, the valve/jet pump arrangement 2 and/or the conveying unit 1 is preferably arranged parallel with the end plate 13 of the fuel cell 29. This is particularly the case when the fuel cell system 31 as a result of structural restrictions on or in the vehicle may have compact dimensions. Therefore, the anode gas flow which is discharged from the jet pump 4 has to be redirected almost at right-angles or at least at an acute angle in order to reach the anode input 3 of the fuel cell 29. In this instance, the flow region of the conveying unit 1 is configured in such a manner that the cross-sectional surface-areas of the end portion of the diffusor region 20 of the jet pump 4, the redirection region 22, the connection piece 26 of the jet pump 4 and the anode input 3 of the fuel cell 29 which extend orthogonally relative to the flow direction VII are at least substantially identical.

FIG. 3 additionally shows that a connection piece 26 is located between the closure lid 5 and the anode input 3 of the fuel cell 29. This connection piece 26 is constructed as a portion of the base member 8 and, by means of the connection piece 26, the medium which is intended to be conveyed can flow without further flow redirection and almost without further friction losses and/or flow losses and/or pressure losses from the redirection region 22 into the anode input 3 of the fuel cell 29. In this instance, the jet pump 4 and/or the base member 8 is/are connected in fluid terms to the anode input 3, wherein in addition an at least additional mechanical securing of the valve/jet pump arrangement 2 on the fuel cell 29, in particular the end plate 13, is possible. The securing of the valve/jet pump arrangement 2 and/or the side channel compressor 10 and/or the water separator 24 to the fuel cell 29, in particular the end plate 13, may in this instance be carried out in a positive-locking and/or non-positive-locking and/or materially engaging manner. Furthermore, the components valve/jet pump arrangement 2 and/or side channel compressor 10 and/or water separator 24 may be arranged in a common housing or be connected to each other in another manner.

Furthermore, the part-pieces base member 8 and/or closure lid 5 are produced from a material or an alloy with a low specific thermal capacity, wherein the components base member 8 and/or closure lid 5 of the jet pump 4 are produced from a metal material or a metal alloy. This exemplary embodiment of the part-pieces promotes a rapid heating of the components in particular in a flow region and consequently a prevention of ice bridges in the event of a cold-start procedure. In this instance, it is further advantageous that the combined valve/jet pump arrangement 2 has a heating element 11, by means of which a rapid heating of the components of the conveying unit 1 can be achieved.

The invention claimed is:

1. A conveying unit (1) for a fuel cell system (31) for conveying and/or recirculating a gaseous medium, the conveying unit (1) having a jet pump (4) which is driven by a propellant jet of the pressurized gaseous medium and a metering valve (6) having a nozzle (12), wherein the conveying unit (1) is constructed as a combined valve/jet pump arrangement (2), wherein the gaseous medium of the jet pump (4) is supplied by the metering valve (6), wherein the jet pump (4) has a base member (8), wherein the jet pump (4) is connected to an anode input (3) of a fuel cell (29), characterized in that there is brought about a redirection and/or direction change of the gaseous medium flowing in a flow direction VII from the jet pump (4) to the anode input (3) of the fuel cell (29) exclusively in a redirection region (22), wherein the jet pump (4) has a separate closure lid (5) which is connected to the base member (8) and wherein the redirection region (22) and/or the redirection and guiding geometry of the redirection region (22) for the gaseous medium is constructed exclusively in the closure lid (5).

2. The conveying unit (1) as claimed in claim 1, characterized in that the closure lid (5) has a redirection nozzle (15), wherein the redirection nozzle (15) of the closure lid (5) in an installed state extends in the base member (8) in a direction of a longitudinal axis (30).

3. The conveying unit (1) as claimed in claim 1, characterized in that a connection piece (26) is located between the closure lid (5) and the anode input (3) of the fuel cell (29).

4. The conveying unit (1) as claimed in claim 2, wherein the redirection nozzle (15) has a recess (17) in an inner shape thereof, wherein the recess (17) is configured to guide the flow of the gaseous medium.

5. The conveying unit (1) as claimed in claim 2, characterized in that in the redirection region (22), a redirection and/or direction change of the gaseous medium is carried out almost at right-angles by the redirection nozzle (15).

6. The conveying unit (1) as claimed in claim 1, characterized in that the closure lid (5) is connected to the base member (8) by a releasable connection so that the closure lid (5) can be disassembled from the base member (8).

7. The conveying unit (1) as claimed in claim 1, characterized in that the base member (8) and/or closure lid (5) is/are produced from a material or an alloy having a low specific thermal capacity.

8. The conveying unit (1) as claimed in claim 2, characterized in that the base member (8) and/or closure lid (5) of the jet pump (4) are produced from a metal material or a metal alloy.

9. The conveying unit (1) as claimed in claim 1, characterized in that the combined valve/jet pump arrangement (2) has a heating element (11).

10. The conveying unit (1) as claimed in claim 1, characterized in that cross-sectional surface-areas of the end portion of a diffusor region (20) of the jet pump (4), the redirection region (22), a connection piece (26) of the jet pump (4) and the anode input (3) which extend orthogonally with respect to the flow direction VII are at least substantially identical.

11. The conveying unit (1) as claimed in claim 1, characterized in that the metering valve (6) is configured as a proportional valve (6).

12. The conveying unit (1) as claimed in claim 1, characterized in that the nozzle (12) and a mixing pipe (18) of the jet pump (4) are configured in a rotationally symmetrical manner, wherein the nozzle (12) extends coaxially with respect to the mixing pipe (18) of the jet pump (4).

13. A fuel cell system (31) having a conveying unit (1) as claimed in claim 1.

14. The conveying unit (1) as claimed in claim 1, wherein the gaseous medium is hydrogen.

15. The conveying unit (1) as claimed in claim 2, wherein the redirection nozzle has a cylindrical outer shape.

16. The conveying unit (1) as claimed in claim 6, wherein the releasable connection is a screw connection.

17. The conveying unit (1) as claimed in claim 4, characterized in that the recess (17) of the redirection nozzle (15) fluidly connects a diffusor region (20) and a connection piece (26) of the jet pump (4) at least indirectly to each other.

18. The conveying unit (1) as claimed in claim 17, characterized in that the recess (17) of the redirection nozzle (15) is formed to be open with respect to a flow cross-section of the diffusor region (20) and a flow cross-section of the connection piece (26) so that the gaseous medium can flow through the redirection nozzle (15) in the flow direction VII.

19. The conveying unit (1) as claimed in claim 4, characterized in that the redirection nozzle (15) has in a region of the recess (17) in an inner flow cross-section thereof at least partially an at least substantially spherical inner space (19).

* * * * *